United States Patent [19]

Fenner et al.

[11] 4,167,285

[45] Sep. 11, 1979

[54] SIDEWALL STRUCTURE OF A BUS WITH SEATS MOUNTED ON THE WALL

[75] Inventors: Hans Fenner, Evilard; Wilhelm Auwarter, Gumlingen; Karl-Heinz Stark, Muttenz, all of Switzerland

[73] Assignee: Ramseier & Jenzer AG, Carosseriewerke Bern, Bern, Switzerland

[21] Appl. No.: 838,986

[22] Filed: Oct. 3, 1977

[30] Foreign Application Priority Data

Apr. 7, 1977 [DE] Fed. Rep. of Germany ....... 2715548

[51] Int. Cl.² .............................................. B62D 27/00
[52] U.S. Cl. ..................................... 296/178; 297/232
[58] Field of Search .............................. 297/232; 52/8; 296/28 A, 63, 64

[56] References Cited

U.S. PATENT DOCUMENTS 3,979,149  9/1976  Vogel .................................... 297/232

Primary Examiner—Joseph F. Peters, Jr.
Assistant Examiner—Gene A. Church
Attorney, Agent, or Firm—Max Fogiel

[57] ABSTRACT

A sidewall construction for a bus having several fitted sections and seats mounted on the wall. A seat fastening strap is attached to a support tube of the seats and extends downward. One of the sections of the sidewall structure, particularly the bottom arch section at the level of the lower end region of the seat fastening strap, has an angle-shaped recess open at the rim and facing the seat fastening strap. The recess has a hanger bar for hanging the seat fastening strap, and a screw lock for disconnectably fixing the seats in place. The recess has an L-shaped cross-section at the open rim, and two arms connect at right angles to this cross-section. The arms correspond, on one hand, with the seat fastening strap, and, on the other hand, they correspond to a screw bolt passing at right angles through the seat fastening strap. One of the arms extends at right angles upward from the hanger bar for hanging the seat fastening strap, and the other arm is an upper horizontal arm facing the recess on its inside and has a threaded groove corresponding to the thread of the screw bolt. The L-shaped cross-section of the recess, in the region corresponding to the face surface of the shank of the screw bolt, has one or several ribs which, together with the screw bolt, form a lengthwise lock for the seats.

9 Claims, 4 Drawing Figures

SIDEWALL STRUCTURE OF A BUS WITH SEATS MOUNTED ON THE WALL

BACKGROUND OF THE INVENTION

The present invention relates to a sidewall construction for a bus having several fitted sections, with seats mounted on the wall. A seat mounting shackle extends downward and is fastened to the support pipe for the seats.

The seats in busses are frequently arranged by two's in a row. The two seats are mounted on a common support frame which on the aisle side is supported by the floor or is suspended without such floor support. On the wall side, frequently a fastening is used in order to have the floor clear underneath the seats. On the wall side a separate section is used which is located and fastened on the inside of the sidewall. This separate section has a dovetail shaped groove for anchoring the seat fastening shackle or strap which, in turn, is welded to the support tube of the seat or the row of seats. The assembly of the seat rows with this embodiment is relatively difficult because it is not possible to hang the seat rows with the seat fastening strap loosely on the wall side.

Another embodiment of a wall-side mounting provides a separate angle section which in a difficult way must again be connected to the side wall structure. But it is possible here to place the seat rows so that spacing correction can still be made. However, assembly of this seating arrangement is still relatively cumbersome on the wall side.

It is, therefore, the object of the present invention to remove the disadvantages of the state of the art and to provide a side wall construction for a bus with wall-side seat mounting of the above type which permits much simpler assembly. In particular, the use of a separate fastening section is to be avoided. The seat fastening, however, must permit loose placement of the seat rows and a suspension of the wall-side seat fastening. An arbitrary fixing in the lengthwise direction, for the purpose of adjusting the spacing of seat rows, must be possible.

Another object of the present invention is to provide a sidewall construction of the foregoing character which may be fabricated at low cost and which has a substantially long service life.

SUMMARY OF THE INVENTION

The objects of the present invention are achieved by providing that one of the continuous sections of the sidewall structure, particularly the bottom arch section, at the level of the lower end region of the seat fastening strap has an angle-shaped recess open at the rim and facing the seat fastening strap. This recess has a hanger bar for hanging the seat fastening strap and a screw lock for the disconnectably fixing of the seats in place. This makes location and fastening of a separate fastening section superfluous, because the wall-side seat-fastening uses a section which already belongs to the wall structure. This section must merely be provided with the recess described, which presents no difficulty, but increases the strength of the sidewall structure. This is of special importance if extruded light-metal sections, particularly aluminum, are used for the sidewall structure. The screw lock permits locating the seat or the row of seats at any location in the lengthwise direction of the bus. The assembly is extremely simple because the seat rows are placed loosely and by hanging the fastening strap in the area of the side wall and can still be corrected. The screw lock is easily accessible underneath the seat and hardly impairs the free space under the seat.

In a preferred embodiment the recess open at the rim has an L-shaped cross-section. Two arms connect at right angles to this cross-section; they correspond to the seat fastening strap on the one hand and to a screw-bolt passing at right angles through the seat fastening strap. Thus, the arms supplement the L-shaped cross-section so that a box section, though open, is produced which contributes to the strength. It is important that the arms are at right angles so that the seat fastening strap and the screw bolt passing through it can again be arranged at right angles so that there is the possibility of loosely hanging the seat row and there is suitable force distribution in the anchoring by tightening the screw.

The lower arm extending at right angles upward forms the hanger bar for hanging the seat fastening strap while the upper horizontal arm on its inside facing the recess has female threads corresponding to the thread of the screw bolt. The female thread is adapted to the thread of the screw bolt, particularly with respect to the pitch and depth of thread. This provides the possibility of being able to tighten the screw bolt at any point in the lengthwise direction of the section, while the screw is turned for engaging the threads and providing a bracing with the end of the seat-fastening strap. It is evident that the screw lock can be easily loosened, when it is necessary to rearrange a bus and to change the spacing between seats.

The L-shaped cross-section of the recess, in the region corresponding to the face surface of the shank of the screw, has one or several ribs which together with the screw constitute a lengthwise lock for the seats. When tightened, the screw bolt digs with the face surface of the shank into the rib or ribs with the metal in this area being partially smashed. This provides a locking in the lengthwise direction which usually, with extruded sections, involves considerable difficulty.

The upper arm has a length, adjusted to the thickness of the fastening strap, relative to the length of the horizontal L leg. This means that the length of the upper arm and the thickness of the fastening strap correspond to the length of the L leg so that a clean right angle force support (staying) is ensured.

There may also be provided two upper horizontal arms in the diameter of the screw bolt which have the grooves on the insides facing each other so that the screw bolt makes contact with the material of the section at two facing points of its periphery. Generally, this double arrangement of the arms is not necessary.

The arms may have projections for covering a floor covering or a side wall covering so that these coverings may come close to the wall-side seat fastening. The arms or projections may also have lugs for inserting a cover strip so that the sidewall structure can also be covered between the seat rows and in the area of the recess.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
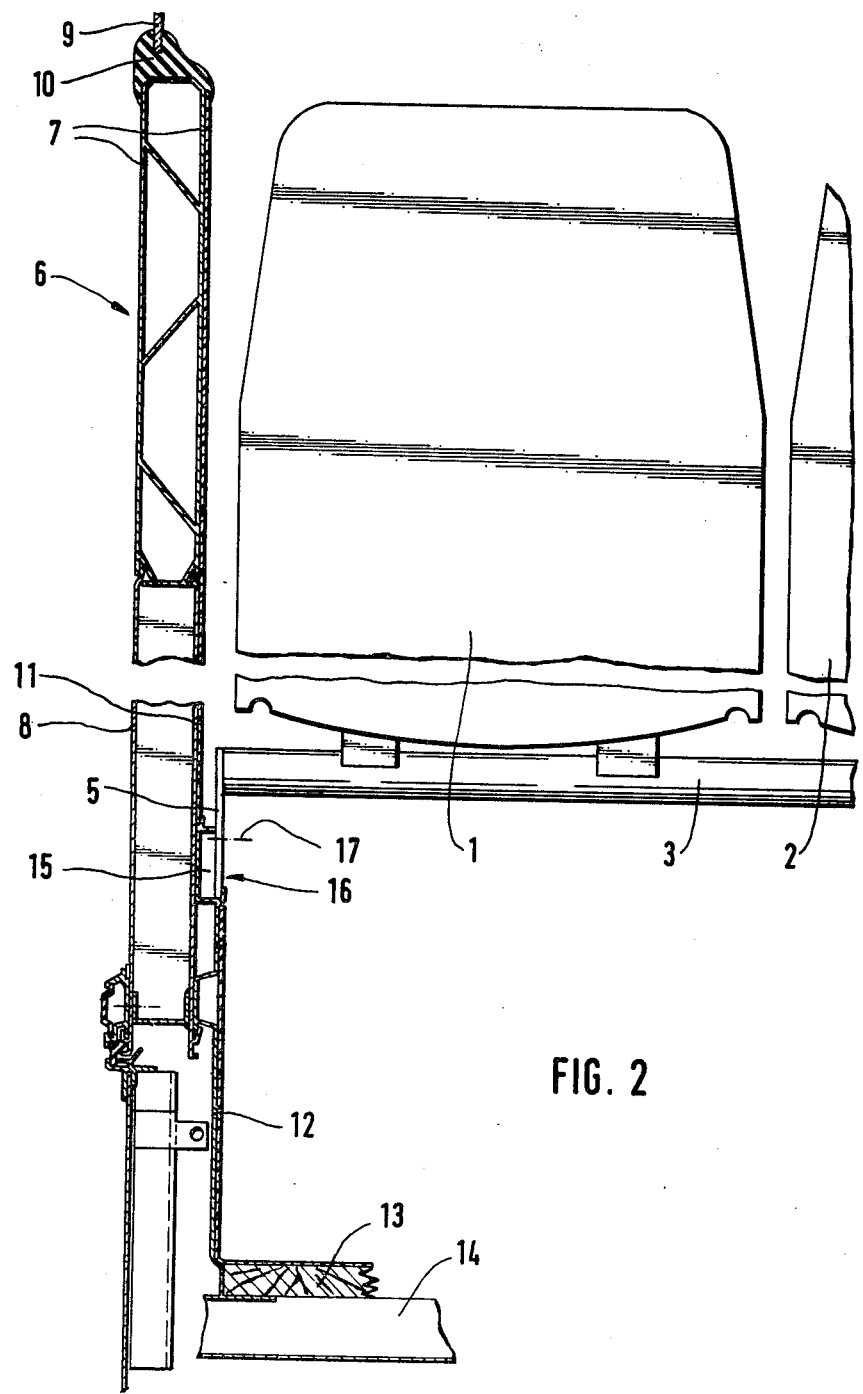
FIG. 2 is a schematic cross-section through the sidewall structure with the wall-side seat fastening arrangement.

FIG. 2 shows the two seats 1, 2 which are combined into a row on the support tube 3. Also, on the aisle side, the support leg, 4 is shown. On the wall side, there is the support tube end at the seat-fastening strap 5.

FIG. 2 shows a schematic of the construction of sidewall 6 of the bus. This side wall construction has a center arch section 7 to whose lower end the outer shell 8 is connected. Further up, the window 9 is indicated which is seated in the sealing compound 10. The center arch section 7 on its inside has the supporting inside shell 11 which also comprises a continuous section. This supporting inside shell is continued in the bottom arch section 12 which at its bottom end holds the floor 13. The latter, in turn, is supported on the crossbars 14 of the chassis.

The bottom arch section 12 in its upper portion, where the seat fastening strap 5 engages, has an angle shaped recess 15 with open rim, which forms a hanger bar 16 for loosely hanging the seat fastening strap 5 and a screw lock 17 for loosably fixing the seats 1, 2. The bottom arch section 12 is connected via partial welds 18 and 19 to the inside shell 11 (FIG. 3).

Figure 3:
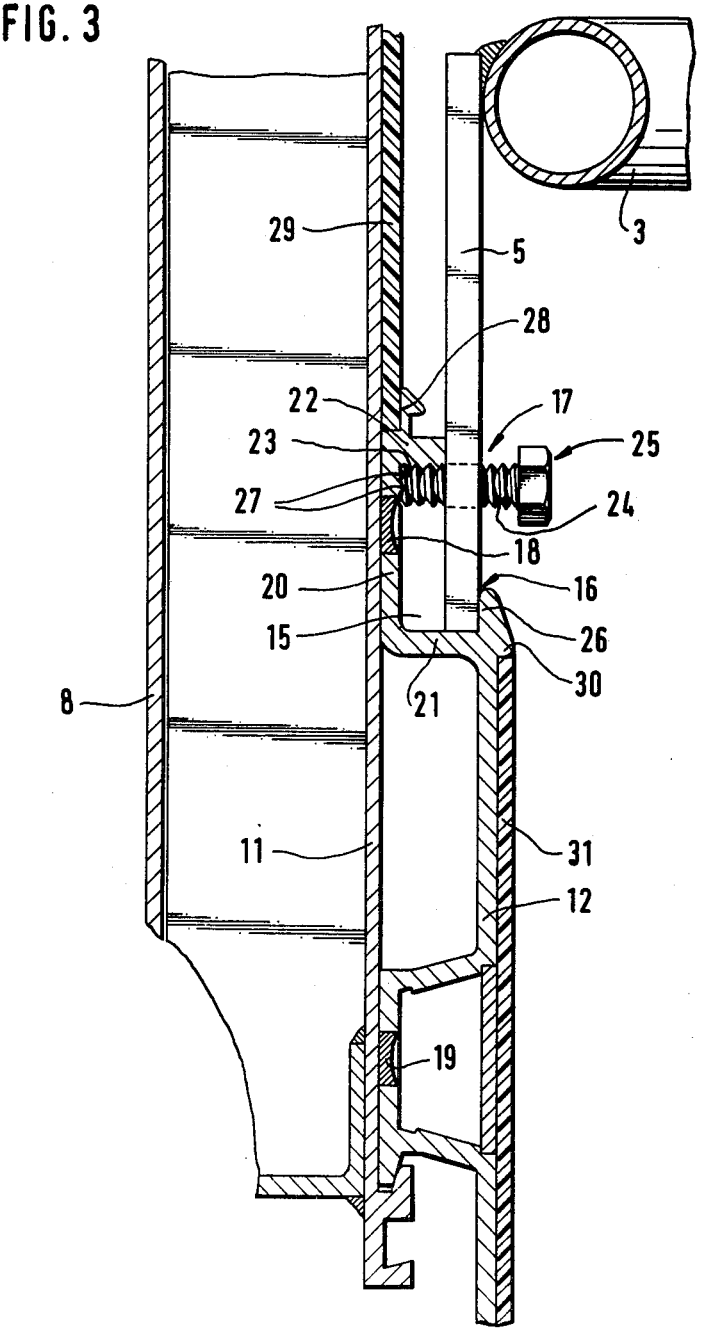
FIG. 3 shows the wall-side seat fastening on an enlarged scale.

FIG. 3 shows the construction of the wall-side seat fastening in detail. The bottom arch section 12 in the area of the recess 15 has an L-shaped cross-section with the two L legs 20 and 21 being provided. The vertical leg 20 is continued in a radially projecting arm 22 which on its inside has a threaded groove 23. The latter conforms to the thread 24 of screw 25 which permeates the seat fastening strap 5. The length of the upper horizontal arm 22 corresponds to the length of the lower L leg 21 reduced by the thickness of the seat fastening strap 5.

Likewise, at the lower L leg 21, and at right angles to it, the lower arm 26 is provided; together with the L leg 21 it forms the hanger bar 16 for the wall-side seat fastening.

The vertical extending leg 20 of the L-shaped cross-section in the region in contact with the face surface of screw 25, has two ribs 27 which of course continue in the lengthwise direction of the bottom arch section 12. When screw bolt 25 is tightened, the shank-side face end digs into these ribs 27 and they are partially smashed. This creates a lengthwise fixing for seats 1, 2 in a simple manner.

At the upper arm 22 is a projection 28 behind which an inside wall covering 29 can be slid. Also, the lower arm 26 has a projection 30 for covering a floor covering 31.

Figure 1:
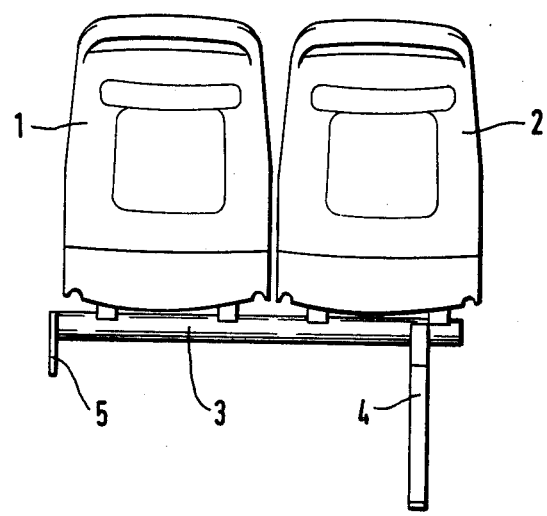
FIG. 1 shows a schematic rear view of a row of seats comprising two seats.
Figure 4:
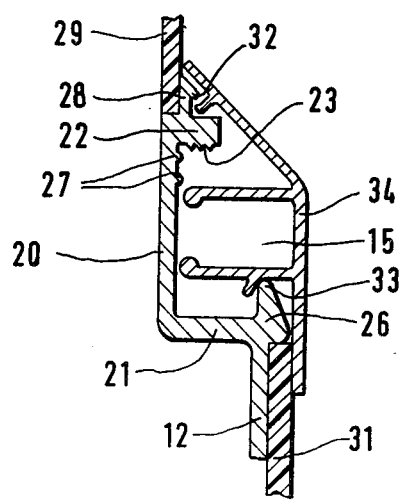
FIG. 4 is a section through the wall-side seat fastening in the area between rows of seats.

As shown by FIG. 4, the projection 28 has a lug 32 while the lower arm 26 has a lug 33. The lugs 32 and 33 serve to insert a cover strip 34 which is located between the seat rows in order to cover the recess 15 and to provide a smooth surface.

The drawings show how the assembly of the seat rows 1, 2 on the wall side can be made particularly simple. The seat rows 1, 2 can be hung loosely with the seat fastening strap 5 into the hanger bar 16 so that spacing adjustments between the seat rows are possible. For the wall side anchoring, one merely tightens screw bolt 25 which is easily accessible underneath the seats. Thread 24 digs into threaded groove 23 causing a bracing with the lower end of the seat fastening strap 5 on the arm 26. The lengthwise lock is formed by the digging in of the face surface of screw bolt 25 in the ribs 27. It is to be understood that the fastening near the aisle is made in a suitable manner. It is also evident that the seat rows can be easily disassembled and anchored with a different spacing at any point in the lengthwise direction of the bus.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A sidewall construction for a bus having a plurality of fitted sections, comprising: seats mounted on the wall and having a support tube; a seat fastening strap attached to said support tube of said seats and extending downward, one of said sections comprising a bottom arch section at the level of a lower end region of said seat fastening strap and having an angle-shaped recess with an open rim and facing said seat fastening strap; a hanger bar in said recess for hanging said seat fastening strap; and screw lock means in said recess for disconnectably fixing said seats in place.

2. A sidewall construction as defined in claim 1 including two arms connecting at right angles to an open rim of said recess, said recess having an L-shaped cross-section at said rim; said arms being associated on one hand with said seat fastening strap and being associated on the other hand with a screw bolt of said screw lock means, said screw bolt passing at right angles through said seat fastening strap.

3. A sidewall construction as defined in claim 2 wherein one of said arms comprises a lower arm extending at right angles upward from said hanger bar for hanging said seat fastening strap, the other one of said arms comprising an upper horizontal arm facing on its inside said recess and having a thread corresponding to the thread of said screw bolt.

4. A sidewall construction as defined in claim 2 including at least one rib in said L-shaped cross-section of said recess in the region corresponding to the face surface of the shank of said screw bolt, said rib together with said screw bolt forming a lengthwise lock for said seats.

5. A sidewall construction as defined in claim 3 wherein said upper arm has a length adjusted to the thickness of said fastening strap and relative to the length of a horizontal leg of said L-shaped cross-section.

6. A sidewall construction as defined in claim 2 wherein said arms comprise further two upper horizontal arms spaced apart by the diameter of said screw bolt and having threads on the inside surfaces facing each other.

7. A sidewall construction as defined in claim 2 including projections on said arms for covering a floor covering or a sidewall covering.

8. A sidewall construction as defined in claim 7 including lug means on said arms for insertion of a cover strip.

9. A sidewall construction as defined in claim 7 including lug means on said projections for insertion of a cover strip.

* * * * *